(12) United States Patent
Rosenhouse et al.

(10) Patent No.: US 8,737,497 B2
(45) Date of Patent: May 27, 2014

(54) ESTIMATING INTERFERENCE IN MULTI CHANNEL SYSTEMS

(75) Inventors: Isaac Rosenhouse, Kiryat-Ono (IL); Haggai Mizrahi, Petach-Tikva (IL)

(73) Assignee: Ceragon Networks Ltd., Tel-Aviv (IL)

( * ) Notice: Subject to any disclaimer, the term of this patent is extended or adjusted under 35 U.S.C. 154(b) by 78 days.

(21) Appl. No.: 13/122,413

(22) PCT Filed: Aug. 4, 2009

(86) PCT No.: PCT/IL2009/000760
§ 371 (c)(1),
(2), (4) Date: Apr. 4, 2011

(87) PCT Pub. No.: WO2010/041236
PCT Pub. Date: Apr. 15, 2010

(65) Prior Publication Data
US 2011/0182344 A1    Jul. 28, 2011

Related U.S. Application Data

(60) Provisional application No. 61/102,920, filed on Oct. 6, 2008.

(51) Int. Cl.
*H04K 1/10* (2006.01)
(52) U.S. Cl.
USPC ........................................................ 375/260
(58) Field of Classification Search
USPC ................................................. 375/260, 343
See application file for complete search history.

(56) References Cited

U.S. PATENT DOCUMENTS

| 2002/0164954 A1* | 11/2002 | Jalali ............................ 455/67.1 |
| 2005/0176436 A1* | 8/2005 | Mantravadi et al. .......... 455/450 |
| 2005/0190848 A1* | 9/2005 | Kiyanagii et al. ............ 375/260 |
| 2007/0047678 A1* | 3/2007 | Sibecas et al. ................ 375/343 |
| 2007/0135050 A1* | 6/2007 | Schiff ............................. 455/62 |

FOREIGN PATENT DOCUMENTS

| WO | WO 2008/020320 | 2/2008 |
| WO | WO 2010/041236 | 4/2010 |

OTHER PUBLICATIONS

International Preliminary Report on Patentability Dated Apr. 21, 2011 From the International Bureau of WIPO Re. Application No. PCT/IL2009/000760.

(Continued)

*Primary Examiner* — Jaison Joseph (57) ABSTRACT

A method for estimating interference between a plurality of carrier signals in a multi-channel system including injecting pilot symbols into a first carrier signal and transmitting the first carrier signal, transmitting a second carrier signal, receiving at least the first carrier signal and the second carrier signal, and estimating interference between the received first carrier signal and the received second carrier signal based, at least in part, on measuring the received first carrier signal when a pilot symbol of the first carrier signal is received. A multi-channel communication system including a plurality of transmitters for a plurality of carrier signals, a pilot symbol injector for injecting silent pilot symbols into at least one of the carrier signals, a plurality of receivers for the plurality of carrier signals, and an interference estimator configured to estimate interference between at least two of the plurality of carrier signals based, at least in part, on receiving silent pilot symbols in at least one of the at least two of the plurality of carrier signals. Related apparatus and methods are also described.

13 Claims, 7 Drawing Sheets

(56) References Cited

OTHER PUBLICATIONS

Communication Relating to the Results of the Partial International Search Dated Dec. 16, 2009 From the International Searching Authority Re.: Application No. PCT/IL2009/000760.

International Search Report and the Written Opinion Dated Feb. 24, 2010 From the International Searching Authority Re.: Application No. PCT/IL2009/000760.

* cited by examiner

ESTIMATING INTERFERENCE IN MULTI CHANNEL SYSTEMS

RELATED APPLICATIONS

This application is a National Phase of PCT Patent Application No. PCT/IL2009/000760 having International filing date of Aug. 4, 2009, which claims the benefit of priority of U.S. Provisional Patent Application No. 61/102,920 filed on Oct. 6, 2008. The contents of the above applications are all incorporated herein by reference.

FIELD AND BACKGROUND OF THE INVENTION

The present invention, in some embodiments thereof, relates to a method for estimating interference between signals in a multi-channel communication system, more particularly, but not exclusively, to estimating interference in point-to-point multi-transmitter wireless communication systems.

Estimating the interference is typically used for canceling the interference and cleaning up the received signals.

The background of the invention will be described with examples from a wireless point to point communication system, which illustrates some of the problems which the present invention solves.

Fixed wireless point to point communication systems are common, for example in cellular networks backhaul and private networks in campuses. Such systems are characterized by high RF frequencies, ranging from several GHz to tens of GHz. As RF frequencies go higher, an associated phase noise increases as well. In single carrier modulations, such as QAM, tracking phase noise may be done using phase-locked loops (PLLs), pilot symbols, or a combination of both. PLL techniques have been known for tens of years. A central component of PLL circuits is a phase detector. Its function is to remove modulated data from a carrier signal and estimate an instantaneous phase of the carrier signal. Removing the data requires estimating the transmitted data. When there are errors in the estimated data, it is not removed correctly, and carrier phase tracking may loose lock, generating more decision errors. This approach falls into the category of decision-directed methods.

In order to overcome the problem of decision errors, it has been proposed to insert known data into the transmitted stream in the form of pilot symbols. US patent application 2005/0111603 of Ginesi et al proposes a practical way to do it for single carrier systems. Once every several data symbols, a pilot symbol is inserted to the data stream. In a receiver, additive noise is filtered out, and an instantaneous phase of the pilot symbol is estimated and interpolated. The above-mentioned approach falls into a category of data-aided methods, and generally outperforms decision-directed methods. A cost of the approach is in form of bandwidth dedicated for the pilot symbols. Naturally, data aided methods and decision-directed methods may be combined.

In addition to tracking carrier phase, efforts are made to increase spectral efficiency of such wireless communication systems. An approach for increasing the spectral efficiency is by transmitting in two orthogonal polarizations. A polarization is the axis along which the electric field of the signal oscillates as radio waves propagate. It is possible to transmit two separate signals, one with the electric field oscillating in one plane, typically named the horizontal plane, and one with the electric field oscillating in a perpendicular plane, typically named the vertical plane. We name these polarizations H and V polarizations correspondingly. There are other ways to share space between two orthogonal polarizations, and the present invention relates to all of them. Communication systems employing two polarizations are called dual-polarization systems, and they double the spectral efficiency of single polarization systems.

Figure 1:
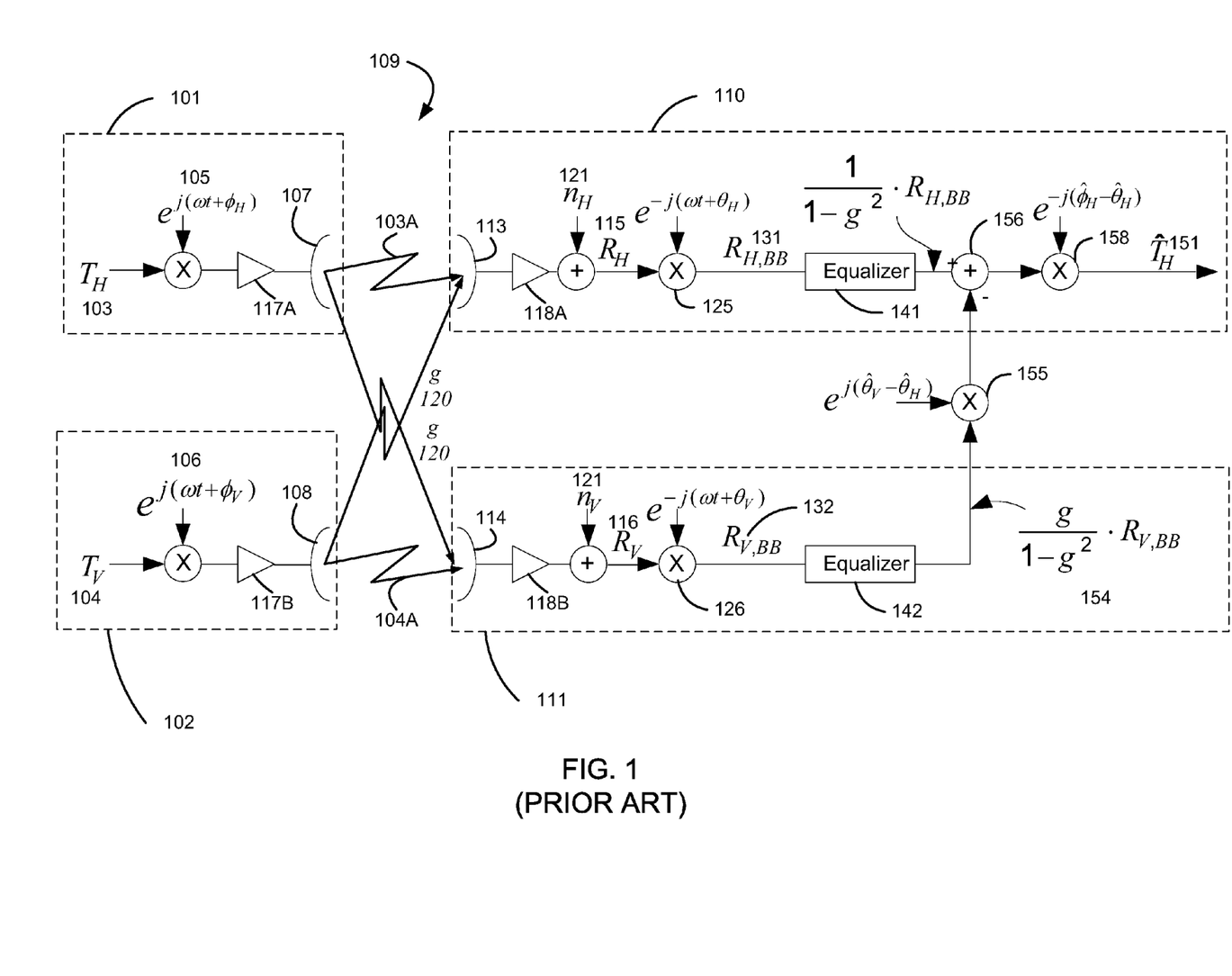
FIG. 1 is a simplified block diagram illustration of an example prior art dual polarization communication system.

Reference is now made to FIG. 1, which is a simplified block diagram illustration of an example prior art dual polarization communication system.

The dual polarization communication system 100 includes a main polarization transmitter 101 and a cross polarization transmitter 102.

The two transmitters 101 102 transmit two data streams $T_H$ 103 and $T_V$ 104, using two carrier signals 105 106, in two orthogonal polarizations. For purpose of simplifying description, an identical carrier frequency $\omega$ is described for both carrier signals 105 106. Phase noise associated with the two carrier signals 105 106 is denoted by $\phi_H$ and $\phi_V$ correspondingly. The two data streams, $T_H$ 103 and $T_V$ 104, are "mixed" with their respective carrier signals 105 106, and optionally amplified by amplifiers 117A 117B, thereby producing two carrier signals for transmission 103A 104A, which are transmitted to two receivers 110 111.

Due to imperfect isolation between polarizations, for example in antennas 107 108 113 114 and in a propagation channel 109, the two carrier signals for transmission 103A 104A often mix. Received signals, $R_H$ 115 and $R_V$ 116, are often mixtures of their intended H and V signals with some amount g 120 of interfering signals V and H correspondingly. Generally speaking, g 120 may be viewed as a filter, that is, a vector of coefficients which multiplies the interfering signals. In order to simplify explanation, g is described as a single coefficient which multiplies the interfering signals. Additive thermal noise $n_V$ 121 and $n_H$ 122 is also typically present.

The received signals $R_H$ 115 and $R_V$ 116 are therefore described by Equation 1 below:

$$R_H = (T_H \cdot e^{j\phi_H} + g \cdot T_V \cdot e^{j\phi_V} + n_H) \cdot e^{j\omega t}$$

$$R_V = (T_V \cdot e^{j\phi_V} + g \cdot T_H \cdot e^{j\phi_H} + n_V) \cdot e^{j\omega t} \qquad \text{Equation 1}$$

Equation 1 shows that a received signal, whether $R_H$ 115 or $R_V$ 116, includes a component of a cross polarized signal, $R_V$ 116 or $R_H$ 115 respectively.

When one wishes to estimate the cross polarization, typically used for canceling the interference and cleaning up the received signals, typically the cross-polarization component in a main signal is "buried" under the main polarization signal. The cross-polarization component is multiplied by the coefficient g, as indicated by the equation above. In some cases g is so small, for example g<0.1, that it is difficult to determine the phase of the cross-polarization component.

Background art includes:

US patent application 2005/0111603 of Ginesi et al;

U.S. Pat. No. 7,046,753 to Resheff et al;

Stuber, G. L., Barry, J. R, Mclaughliln, S. W., Li, Y., Ingram, M. A. and Pratt, T. G., "Broadband MIMO-OFDM Wireless Communications", *Proceedings of the IEEE*, Vol. 92, No. 2, pp. 271-294, February 2004; and Jiang, M., Hanzo, L., "Multiuser MIMO-OFDM for Next-Generation Wireless Systems", *Proceedings of the IEEE*, Vol. 95, No. 7, pp. 1430-1469, July 2007.

SUMMARY OF THE INVENTION

The present invention, in some embodiments thereof, relates to a method for estimating interference between signals in a multi-channel communication system, more particularly, but not exclusively, to estimating interference in point-to-point multi-transmitter wireless communication systems.

Estimating the interference is typically used for canceling the interference and cleaning up the received signals.

In order to track the interference, optionally using pilot symbols, the present invention removes, at least some of the time, the problem which was phrased in the background section, that is, that a cross polarization component is "buried" under a main polarization signal. In some embodiments of the invention a main polarization component is zeroed when a pilot symbol of the cross polarization is received, and optionally vice versa.

Exemplary embodiments of the invention insert "silent" pilot symbols and regular pilot symbols periodically. Regular pilot symbols are symbols which are transmitted with a known value, at a known position in a symbol stream. A receiver receives the regular pilot symbols and deciphers the symbols, yet also "knows" what the value should be. Regular pilot symbols are typically used for calibration of a receiver—a regular pilot symbol is received, and since its expected value is known, a receiver can be calibrated to provide the expected value when receiving the regular pilot symbol. Pilot symbols can be used to track magnitude or phase changes. Silent pilot symbols are symbols with a zero magnitude. The silent pilot symbols are used to "uncover" the cross polarization component in a main polarization signal.

Exemplary embodiments of the invention insert non-silent pilot symbols into the main polarization signal, and yet mange to remove the non-silent pilot symbols from the main polarization signal and uncover the cross polarization component in the main polarization signal.

According to an aspect of some embodiments of the present invention there is provided a method for estimating interference between a plurality of carrier signals in a multi-channel system including injecting pilot symbols into a first carrier signal and transmitting the first carrier signal, transmitting a second carrier signal, receiving at least the first carrier signal and the second carrier signal, and estimating interference between the received first carrier signal and the received second carrier signal based, at least in part, on measuring the received first carrier signal when a pilot symbol of the first carrier signal is received.

According to some embodiments of the invention, the first carrier signal and the second carrier signal are orthogonally polarized relative to each other.

According to some embodiments of the invention, the estimating includes estimating differential phase.

According to some embodiments of the invention, the estimating is performed by equalizing the received first carrier signal and the received second carrier signal, and measuring the differential phase between the equalized received first carrier signal and the equalized received second carrier signal, when a pilot symbol of the first carrier signal is received.

According to some embodiments of the invention, at least some of the pilot symbols injected into the first carrier include silent pilot symbols.

According to some embodiments of the invention, the injecting silent pilot symbols into the first carrier signal is done substantially at the same time regular pilot symbols are injected into the second carrier signal.

According to some embodiments of the invention, the injecting pilot symbols into a first carrier signal includes injecting a plurality of consecutive pilot symbols into the first carrier signal.

According to some embodiments of the invention, the plurality of carrier signals includes more than two carrier signals.

According to some embodiments of the invention, the plurality of carrier signals are injected with pilot symbols and the plurality of carrier signals are transmitted.

According to some embodiments of the invention, the injecting pilot symbols into a first one of the plurality of carrier signals is done substantially at the same time regular pilot symbols are injected into others of the plurality of carrier signals.

According to some embodiments of the invention, the injecting regular pilot symbols into a first one of the plurality of carrier signals is done substantially at the same time as silent pilot symbols are injected into others of the plurality of carrier signals.

According to an aspect of some embodiments of the present invention there is provided a method for estimating interference between a plurality of carrier signals in a multi-channel system including transmitting signals in a first carrier and in a second carrier, receiving at least a signal of the first carrier and a signal of the second carrier, estimating the differential phase between the first carrier and the second carrier based, at least in part, on measuring the differential phase between the received signal of the first carrier and the received signal of the second carrier when a known symbol of the first carrier is received.

According to an aspect of some embodiments of the present invention there is provided a point-to-point communication system including a plurality of receivers for a plurality of carrier signals, and an interference estimator configured to estimate differential phase between at least two of the plurality of carrier signals based, at least in part, on receiving silent pilot symbols in at least one of the at least two of the plurality of carrier signals.

According to an aspect of some embodiments of the present invention there is provided a multi-channel communication system including a plurality of transmitters for a plurality of carrier signals, a pilot symbol injector for injecting silent pilot symbols into at least one of the carrier signals, a plurality of receivers for the plurality of carrier signals, and an interference estimator configured to estimate interference between at least two of the plurality of carrier signals based, at least in part, on receiving silent pilot symbols in at least one of the at least two of the plurality of carrier signals.

According to an aspect of some embodiments of the present invention there is provided apparatus using the method described above.

According to an aspect of some embodiments of the present invention there is provided a computer program embodied on a computer-readable medium for implementing the method described above.

According to an aspect of some embodiments of the present invention there is provided apparatus for estimating interference between a plurality of carrier signals in a multi-carrier communication system including means for injecting silent pilot symbols into a first carrier signal, means for transmitting the first carrier signal, means for transmitting a second carrier signal, means for receiving at least the first carrier signal and the second carrier signal, means for estimating interference between the first carrier signal and the second carrier signal based, at least in part, on measuring the received signal of the first carrier signal during reception of the silent pilot symbols of the first carrier.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a method for estimating interference between signals in a multi-channel communication system, more particularly, but not exclusively, to estimating interference in point-to-point multi-transmitter wireless communication systems.

Estimating the interference is typically used for canceling the interference and cleaning up the received signals.

In order to track interference using pilot symbols, the present invention removes, at least some of the time, the problem which was phrased in the background section, that is, that a cross polarization component is "buried" under a main polarization signal.

In some embodiments of the invention a main polarization component is zeroed when a pilot symbol of the cross polarization is received, and optionally vice versa.

Defining a "gain" g at which a cross polarization signal is received by a main polarization receiver, some cases of communication systems occur with a g approximately 0.25. Such a large g is a problem, indicating a large amount of interference. Yet a large g also makes it easier to detect the interference. The present invention enables "uncovering" interference over a large range of values of g, from large values to small values, even at low g such as g<0.1.

It is again noted, as above, that generally speaking, g may be viewed as a filter, that is, a vector of coefficients which convolves with the interfering signals, and that in order to simplify explanation, g is described as a single coefficient which multiplies the interfering signals.

Exemplary embodiments of the invention insert "silent" pilot symbols and regular pilot symbols periodically. Regular pilot symbols are symbols with a known magnitude and phase, enabling to estimate phase noise by calculating a difference between a measured phase of the pilot symbol and a known phase of the pilot symbol.

Silent pilot symbols are symbols with a zero magnitude. The silent pilot symbols are used to "uncover" the cross polarization component in a main polarization signal.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

In order to illustrate example embodiments of the invention, a wireless dual-polarization communication system is described, and the improvements brought forth by the example embodiments of the invention are explained.

Reference is now made again to FIG. 1, which is a simplified block diagram illustration of an example prior art dual polarization communication system.

The dual polarization communication system 100 includes a main polarization transmitter 101 and a cross polarization transmitter 102.

The two transmitters 101 102 transmit two data streams $T_H$ 103 and $T_V$ 104, using two carrier signals 105 106, in two orthogonal polarizations. For purpose of simplifying description, an identical carrier frequency $\omega$ is described for both carrier signals 105 106. Phase noise associated with the two carrier signals 105 106 is denoted by $\phi_H$ and $\phi_V$ correspondingly. The two data streams, $T_H$ 103 and $T_V$ 104, are "mixed" with their respective carrier signals 105 106, and optionally amplified by amplifiers 117A 117B, thereby producing two carrier signals for transmission 103A 104A, which are transmitted to two receivers 110 111.

Due to imperfect isolation between polarizations, for example in antennas 107 108 113 114 and in a propagation channel 109, the two carrier signals for transmission 103A 104A often mix. Received signals, $R_H$ 115 and $R_V$ 116, are often mixtures of the transmission signals with g 120, a mixing coefficient. It is noted that when g 120 is taken as a filter g 120, the received signals, $R_H$ 115 and $R_V$ 116, are often convolutions of the transmission signals with g 120. Additive thermal noise $n_V$ 121 and $n_H$ 122 is also typically present.

The received signals $R_H$ 115 and $R_V$ 116 are therefore described by Equation 1 below:

$$R_H = (T_H \cdot e^{j\phi_H} + g \cdot T_V \cdot e^{j\phi_V} + n_H) \cdot e^{j\omega t}$$

$$R_V = (T_V \cdot e^{j\phi_V} + g \cdot T_H \cdot e^{j\phi_H} + n_V) \cdot e^{j\omega t} \quad \text{Equation 1}$$

The same mixing coefficient g 120 is used for both of the received signals, for purpose of simplicity of description. In practical systems g 120 is different for the two received signals 115 116, and is also time varying, frequency dependent, and complex.

The received signals $R_H$ 115 and $R_V$ 116 are typically optionally amplified by amplifiers 118A 118B, and down-converted to base-band using two converters 125 126. The two converters 125 126 may use separate RF sources, which may have different phase noise and possibly somewhat different frequencies. For purpose of simplicity of description the two frequencies are described as identical. Also for simplicity of description the two frequencies are denoted as identical to an up-converter frequency at the transmitters and the two down-conversion frequencies are also denoted by the same $\omega$ used to describe the carrier signal 105 106 frequencies.

Denoting a carrier phase noise of the H-polarization down-converter 125 by $\theta_H$ and a carrier phase noise of the V-polarization down-converter 126 by $\theta_V$, the following expression describes the down-converted signals $R_{H,BB}$ $R_{V,BB}$.

$$R_{H,BB} = (T_H e^{j(\phi_H - \theta_H)} + g \cdot T_V e^{j(\phi_V - \theta_H)} + n_H)$$

$$R_{V,BB} = (T_V e^{j(\phi_V - \theta_V)} + g \cdot T_H e^{j(\phi_H - \theta_V)} + n_V) \quad \text{Equation 2}$$

Equation 2 reveals that the down-converted received signals $R_{H,BB}$ 131 and $R_{V,BB}$ 132 contain a component of the transmitted H signal and a component of the transmitted V signal. The transmitted H component is referred to herein, for purpose of example, as a main polarization component, and the transmitted V component is referred to as a cross polarization component.

The down-converted received signal $R_{H,BB}$ 131 is referred to as the main polarization signal 131. The down-converted received signal $R_{V,BB}$ 132 is referred to as the cross-polarization signal 132.

Estimation of the H-polarization signal is now described, and it is noted that estimation of the V-polarization signal is done in a similar manner.

Equation 2 is solved, providing an estimate of transmitted symbols $\hat{T}_H$ 151 and corresponding $\hat{T}_V$ (not shown) as follows:

$$\hat{T}_H = \left( \frac{R_{H,BB} - g \cdot R_{V,BB} \cdot e^{j(\hat{\theta}_V - \hat{\theta}_H)}}{1 - g^2} \right) \cdot e^{-j(\hat{\phi}_H - \hat{\theta}_H)} \quad \text{Equation 3}$$

$$\hat{T}_V = \left( \frac{R_{V,BB} - g \cdot R_{H,BB} \cdot e^{j(\hat{\theta}_H - \hat{\theta}_V)}}{1 - g^2} \right) \cdot e^{-j(\hat{\phi}_V - \hat{\theta}_V)}$$

Equation 3 implies that in order to estimate the transmitted symbols, two phase rotations are done. In order to estimate the transmitted symbol $\hat{T}_H$ 151 of the H-polarization signal, the cross polarization signal 132 has to be rotated by an estimate of $\theta_V - \theta_H$, denoted by $\hat{\theta}_V - \hat{\theta}_H$. The estimate of the phase difference $\theta_V - \theta_H$ is referred to as a differential phase. The rotation is depicted in FIG. 1 by reference number 155. The rotation may be performed by the cross polarization receiver 111, by the main polarization receiver 110, or by some separate component.

It is noted that phase difference between a main polarization signal and a cross polarization signal in a typical point-to-point communication system can be any phase difference, and is typically time varying and arbitrary.

Before the rotation 155, the cross polarization signal is multiplied by $g/(1-g^2)$ 154. The multiplication is performed by an equalizer 142. The result of the multiplication is then rotated 155.

The result of the rotation is subtracted from the main polarization signal, which has been divided by $1-g^2$ by a main polarization equalizer 141. The subtraction is depicted in FIG. 1 by reference number 156. The result is rotated (reference number 158) by an estimate of a common phase difference $\Phi_H - \theta_H$, denoted by $\hat{\phi}_H - \hat{\theta}_H$. The common phase difference is a difference between the phase of the transmitted signal $\Phi_H$ and the phase which the receiver $\theta_H$ A similar estimation is performed for the V-polarization signal.

$\theta_d$ and $\hat{\theta}_d$ are used for denoting differential phase and an estimate of the differential phase respectively, and $\theta_c$ and $\hat{\theta}_c$ are used to denote common phase and an estimate of the common phase respectively.

The gain values applied to the main and cross signals, $$\frac{1}{1-g^2}$$

and $$\frac{g}{1-g^2}$$

respectively, are obtained using equalizers 141 142.

As stated above, the gain values are typically frequency dependent, time varying and complex, and the equalizer optionally implements time-varying filters. Scalar gain values g 120 are used in FIG. 1 for simplification only.

Rotation 155 of the cross-polarization signal by the differential phase enables canceling the cross-polarization component from the main-polarization signal by subtraction. The remaining signal contains main polarization components only. Thus, if pilot symbols are inserted into the cross polarization signal, the pilot symbols exist only before the subtraction. The above is formulated mathematically below.

Inserting expressions of the down-converted signals from Equation 2 into Equation 3 provides the following expression for the estimated H signal:

$$\hat{T}_H = \text{H polarization term} + \text{V polarization term} + \text{Noise term} \quad \text{Equation 4}$$

where $$\text{H polarization term} = T_H \cdot e^{j(\theta_c - \hat{\theta}_c)} \frac{(1 - g^2 \cdot e^{j(\theta_d - \hat{\theta}_d)})}{1 - g^2}$$

$$\text{V polarization term} = \frac{g \cdot T_V \cdot e^{j(\phi_V - \theta_H - \hat{\theta}_c)}(1 - e^{j(\theta_d - \hat{\theta}_d)})}{1 - g^2}$$

$$\text{Noise term} = \frac{n_H - g \cdot n_V \cdot e^{-j(\hat{\theta}_d + \hat{\theta}_c)}}{1 - g^2}$$

When the differential phase is estimated accurately, such that substantially $\hat{\theta}_d = \theta_d$, Equation 4 simplifies to:

$$\hat{T}_H = T_H \cdot e^{j(\theta_c - \hat{\theta}_c)} + \text{Noise Term} \quad \text{Equation 5}$$

Equation 5 has the H signal rotated by the common phase estimation error plus a noise term.

Estimating the common phase $\hat{\theta}_c$ may be done by any of the methods previously mentioned, that is, via a PLL or pilot symbols.

Estimation of the differential phase $\hat{\theta}_d$ is more challenging since it is the phase between the cross polarization components in the main and cross signals; these components vanish completely when the differential phase is correctly estimated, as indicated by Equation 5. U.S. Pat. No. 7,046,753 to Resheff et al teaches a method to for tracking the differential phase $\hat{\theta}_d$. The method of Resheff et al is a decision directed method. The method attempts to minimize a mean-square-error (MSE) associated with the estimation of the main component. Hence, control of the differential phase rotator is implemented by feedback based on a decision error of the main signal. There are two implications to this approach. First, there is always some delay associated with a feedback path. In some cases the delay may prohibit implementing a fast tracking loop. Second, decision errors may cause the phase tracking loop to lose lock.

It is noted that embodiments of the present invention, examples of which are described below with reference to FIGS. 2-4, use a data directed, or data driven, method, in contrast with the decision directed or decision driven method taught by Resheff et al. The method of the present invention tracks noise quickly, not relying on feedback for estimating, or measuring, the interference.

If pilot symbols were to be used in order to track the differential phase, they would have to be employed before subtracting the cross-polarization signal. The purpose of these pilot symbols would be to assist in defining the required rotation, such that the cross polarization components in the main and cross signals have the same phase. This way they could cancel when subtracted.

The problem with this configuration is that the cross-polarization component in the main signal is "buried" under the main polarization signal. It is multiplied by the coefficient g 120, as indicated by Equation 2. In some cases g 120 is so small, by way of a non-limiting example, g<0.1, that it is impossible to determine the phase of the cross-polarization component.

Exemplary embodiments of the present invention, described below, include a new method for using pilot symbols for estimating the differential phase. The method provides a robust solution even when the cross polarization is small, such as when g<0.1, and since the method is not based on feedback, tracking speed is not slowed down.

In some embodiments of the invention, in order to solve the problem that the cross polarization component is "buried" under the main polarization component in the main signal, the main polarization component is optionally zeroed, at least some of the time. Zeroing the main polarization component is also termed inserting a silent pilot symbol.

In some embodiments of the invention, the silent pilot symbol is inserted when a pilot symbol of the cross polarization is produced. Silent pilot symbols and regular pilot symbols periodically. The frequency, or period, in which the silent pilot symbols are injected into the data stream, need not be identical to that of regular pilot symbols.

Figure 2A:
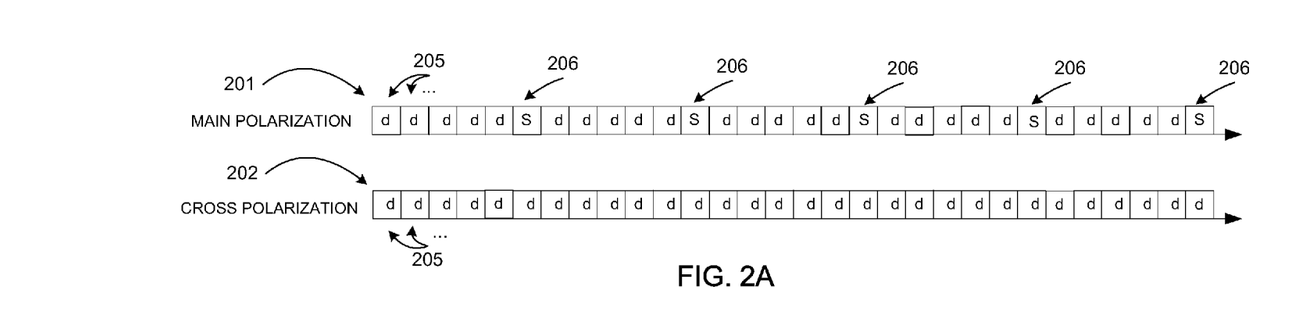
FIG. 2A is a simplified illustration of a timeline of a main data stream and a cross data stream, in which the main data stream is produced according to an embodiment of the invention.

Reference is now made to FIG. 2A, which is a simplified illustration of a timeline of a main data stream 201 and a cross data stream 202, in which the main data stream 201 is produced according to an embodiment of the invention.

The main data stream 201 and the cross data stream 202 have data symbols 205, and occasionally the main data stream 201 has silent pilot symbols 206 inserted. It is noted that the silent pilot symbols 206 are not necessarily inserted between every 5 data symbols, the frequency of insertion is depicted in FIG. 2A for purpose of simplified explanation.

Referring back to the equations above, when the silent pilot symbol 206 is inserted into the main data stream 201, $T_H=0$, and the equations simplify.

It is noted that the silent pilot symbols are optionally added to a data stream as often as needed to track changes in the differential phase. Optionally the silent pilot symbols are added no more often than required. It is noted that differential phase typically changes slowly, relative to the number of symbols communicated over the data streams.

Figure 2B:
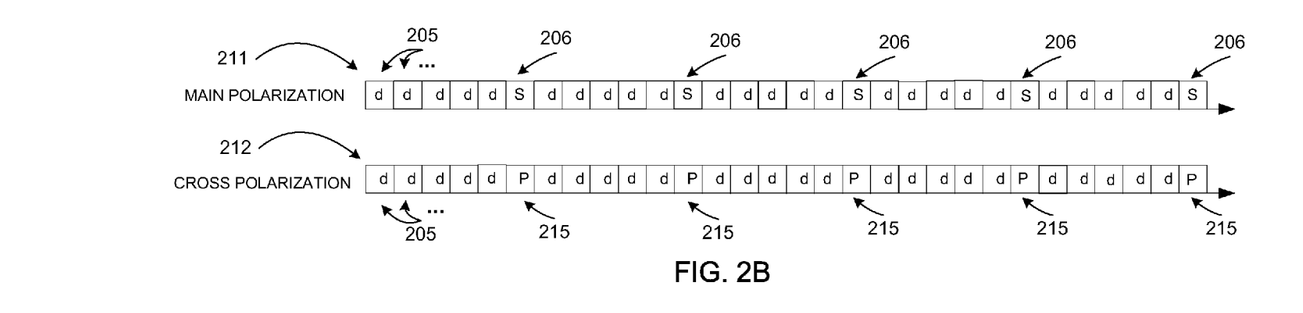
FIG. 2B is a simplified illustration of a timeline of a main data stream and a cross data stream, in which the main data stream and the cross data stream are produced according to an alternative embodiment of the invention.

Reference is now made to FIG. 2B, which is a simplified illustration of a timeline of a main data stream 211 and a cross data stream 212, in which the main data stream 211 and the cross data stream are produced according to an alternative embodiment of the invention.

The main data stream 211 and the cross data stream 212 have data symbols 205, as in FIG. 2A. Occasionally the main data stream 211 has silent pilot symbols 206 inserted, at the same time the cross data stream 212 has regular pilot symbols 215 inserted.

Referring back to the equations above, when the silent pilot symbol 206 is inserted into the main data stream 201, $T_H=0$, and at the same time $T_V$ is a known quantity, because $T_V$ is a pilot symbol.

It is noted that for dealing with possible instances where the main data stream 211 and the cross data stream 212 do not transmit symbols simultaneously, but with a certain lag, the main data stream 211 optionally includes more than one consecutive silent pilot symbols 206 inserted, instead of insertion of the silent pilot symbols 206 one at a time, as depicted in FIG. 2B.

The injection of a plurality of consecutive plot symbols refers to all example embodiments described herein.

Figure 2C:
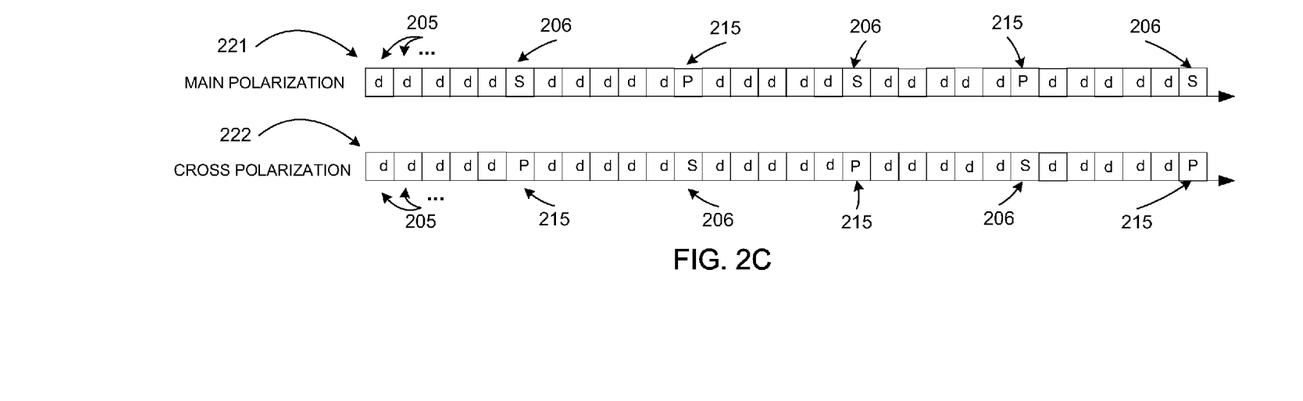
FIG. 2C is a simplified illustration of a timeline of a main data stream and a cross data stream, in which both data streams are produced according to another alternative embodiment of the invention.

Reference is now made to FIG. 2C, which is a simplified illustration of a timeline of a main data stream 221 and a cross data stream 222, in which both data streams are produced according to another alternative embodiment of the invention.

The main data stream 221 and the cross data stream 222 have data symbols 205, as in FIG. 2B. Each of the main data stream 221 and the cross data stream 222 have silent pilot symbols 206 inserted, at the same time the other data stream has regular pilot symbols 215 inserted.

The configuration of FIG. 2C enables each of the main data stream 221 and the cross data stream 222 to estimate the differential phase using the method of the invention.

In FIG. 2C, silent pilot symbols 206 and regular pilot symbols 215 appear in pairs. There is always a silent pilot symbol 206 in one polarization when there is a regular pilot symbol 215 in the other and vice versa. The same overhead (bandwidth) is paid for the regular pilot symbols 215 and the silent pilot symbols 206. This may not always be optimal. Sometimes, there can be more regular pilot symbols than silent pilot symbols.

Figure 2D:
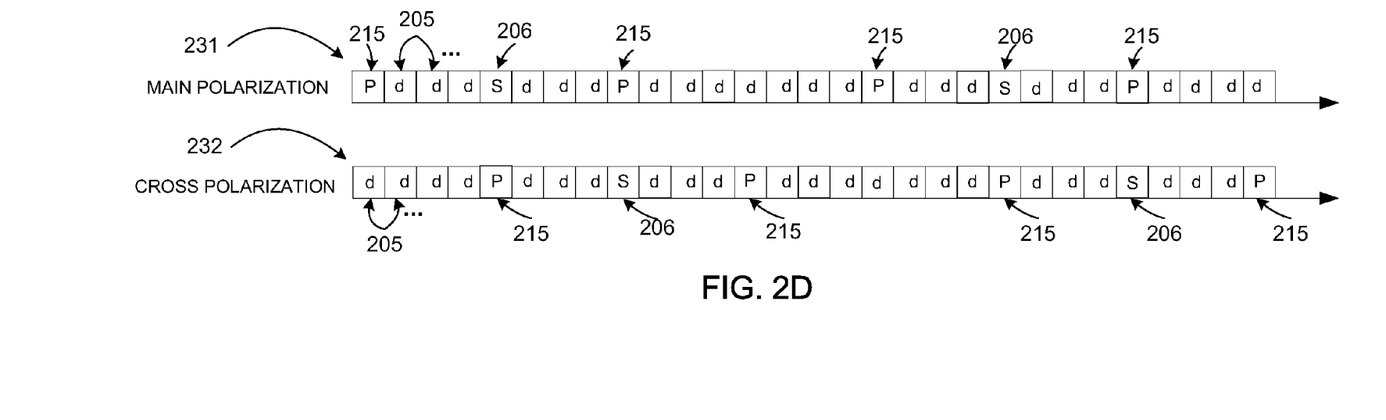
FIG. 2D is a simplified illustration of a timeline of a main data stream and a cross data stream, according to another alternative embodiment of the invention, in which a frequency of silent pilot symbols is a multiple of the frequency of regular pilot symbols.

Reference is now made to FIG. 2D, which is a simplified illustration of a timeline of a main data stream 231 and a cross data stream 232, according to another alternative embodiment of the invention, in which a frequency of silent pilot symbols 206 is a multiple of the frequency of regular pilot symbols 215.

FIG. 2D depicts a case in which a period of the silent pilot symbols 206 is, by way of a non-limiting example, a multiple of a period of the regular pilot symbols 215. In FIG. 2D, a regular pilot symbol appears in one polarization, while data appears in the other polarization. However, when a silent pilot symbol 206 appears in one polarization, there is always a regular pilot symbol in the other polarization. An opposite situation, not depicted, is also possible, that is, more silent pilot symbols 206 than regular pilot symbols 215. In the opposite situation, there are some cases in which a silent pilot symbol in appears in one polarization while a regular data symbol appears in the other.

Furthermore, appearance of pilot symbols may be non-periodic, and/or periodic in a more complicated sense.

Figure 2E:
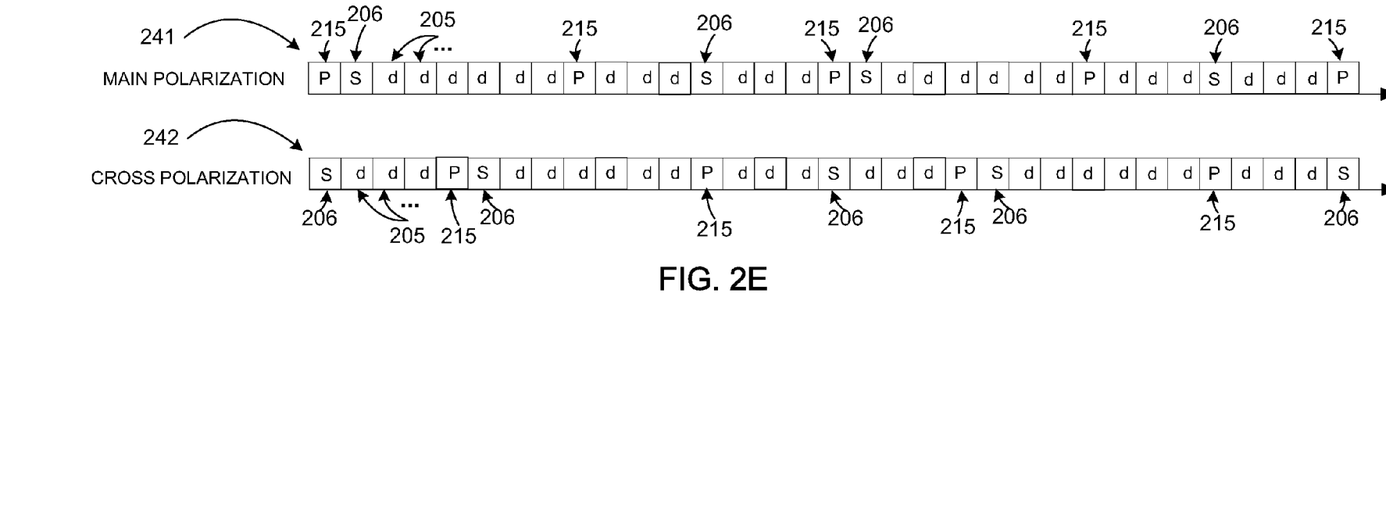
FIG. 2E is a simplified illustration of a timeline of a main data stream and a cross data stream, according to yet another alternative embodiment of the invention, in which a frequency of silent pilot symbols is different from the frequency of regular pilot symbols.

Reference is now made to FIG. 2E, which is a simplified illustration of a timeline of a main data stream 241 and a cross data stream 242, according to yet another alternative embodiment of the invention, in which a frequency of silent pilot symbols 206 is different from the frequency of regular pilot symbols 215.

By way of a non-limiting example, FIG. 2E depicts a case in which the regular pilot symbols 215 are periodic with period 8. The silent pilot symbols 206 are periodic with period 16, and during the timeline depicted additional silent pilots are added, unequally spaced.

It is noted that other frequencies and other distributions of regular pilot symbols 215 and silent pilot symbols 206 are contemplated.

FIGS. 2A to 2E depict two data streams—a main polarization data stream and a cross polarization data stream. It is possible that more than two data streams be present in a communication system, with interference between any two or more of the data streams. A non-limiting example can be a communication system with two antennas using a same frequency, each antenna using two polarizations.

A non-limiting example of three data streams using silent pilot symbols to estimate interference between each pair of data streams is described below. A person skilled in the art is able to extrapolate from the three data stream example to any larger number of data streams.

Figure 2F:
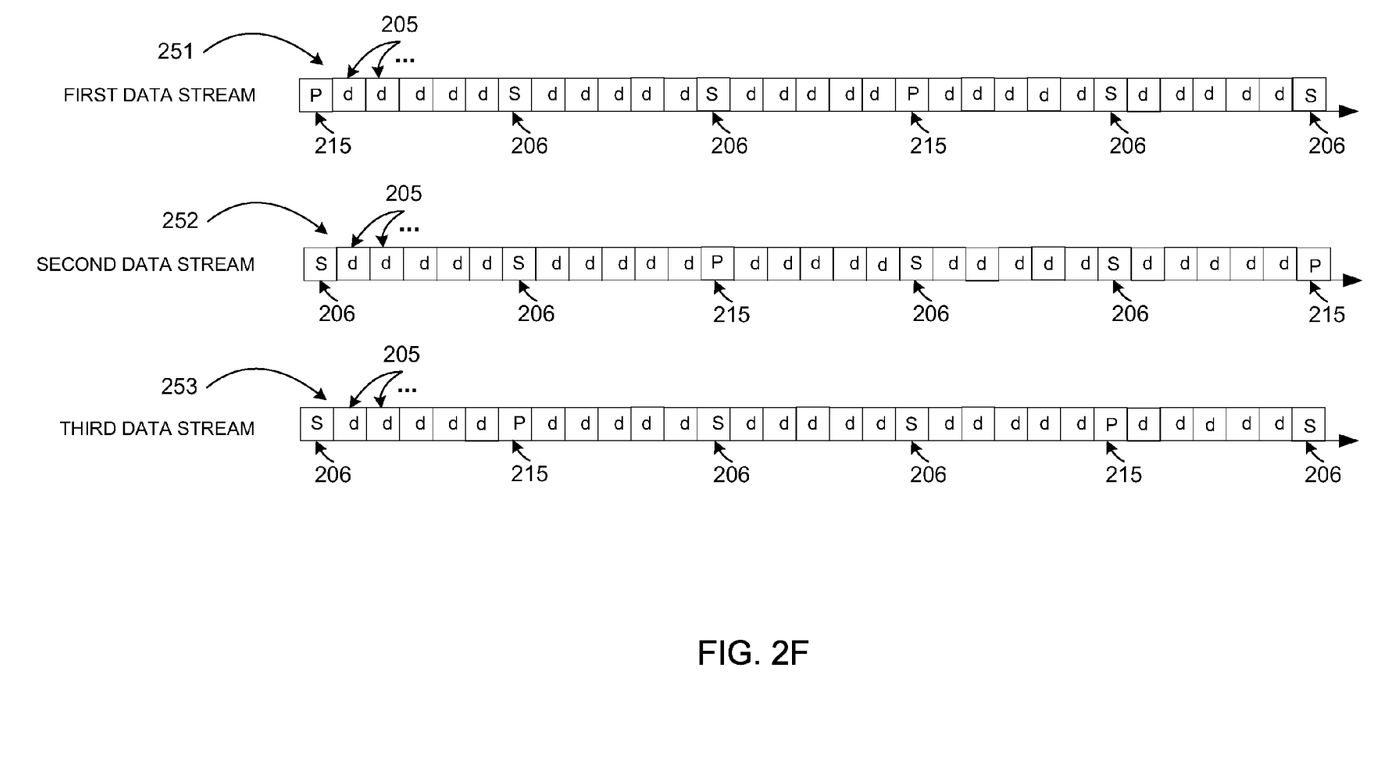
FIG. 2F is a simplified illustration of a timeline of three data streams, according to still another alternative embodiment of the invention.

Reference is now made to FIG. 2F, which is a simplified illustration of a timeline of three data streams, according to still another alternative embodiment of the invention.

FIG. 2F depicts a case in which a first data stream 251, a second data stream 252, and a third data stream, 253, include data symbols 205, regular pilot symbols 215, and silent pilot symbols.

FIG. 2F depicts the three data streams 251 252 253 with silent pilot symbols 206 inserted into two of the data streams whenever a third data stream has a regular pilot symbol 215. The regular pilot symbols 215 are rotated among the three data streams 251 252 253 in turn. In this FIG. 2E is a three-data-stream example similar to the two-data-stream example of FIG. 2B.

The regular pilot symbols 215 of FIG. 2F are periodic with period 18. The silent pilot symbols 206 are periodic with period 6, except that the place of every third silent pilot symbol 206 is taken by a regular pilot symbol 215. It is noted that other frequencies and other distributions of regular pilot symbols 215 and silent pilot symbols 206 are contemplated.

FIG. 2F describes a case of using pilot symbols in three data streams. The description is presented for purpose of teaching use of pilot symbols in multi-transmitter system, multi-receiver systems, and multi-carrier communication systems in general.

When a silent pilot symbol is received in a main-polarization component of a signal, while a regular pilot symbol is received in a cross-polarization component, the base-band representation of the received signals, as described by Equation 2, is simplified to:

$$R_{H,BB} = g \cdot P_V \cdot e^{j(\phi_V - \theta_H)} + n_H$$

$$R_{V,BB} = P_V \cdot e^{j(\phi_V - \theta_V)} + n_V \qquad \text{Equation 6}$$

where $P_V$ represents a pilot symbol of the vertical, or cross, polarization. Comparing the phase of the main and cross polarization signals in Equation 6 and neglecting noise components:

$$\hat{\theta}_d = \text{Phase}(R_{H,BB}) - \text{Phase}(R_{V,BB}) \qquad \text{Equation 7}$$

The estimated differential phase of Equation 7 is optionally further filtered, in order to further improve the differential phase estimation of Equation 7.

Examples for filtering methods, by way of a non-limiting example, are a Wiener filter and a Kalman filter. It is noted that the filters are capable of directly providing estimates of the differential phase also for symbols in between pilot symbols. The filters act as ideal interpolators, taking into consideration a mathematical model of phase noise and thermal noise.

If no phase noise model is available, the filtering process is optionally skipped. The differential phase associated with symbols in between pilot symbols may be mathematically interpolated using a linear interpolator, a cubic-spline interpolator, and/or other interpolating methods known in the art.

Some embodiments of the invention include a mechanism for ensuring that a silent pilot symbol is received at a same instant which a regular pilot symbol is received in a cross polarization signal. Such a mechanism may be, by way of a non-limiting example, a feedback mechanism from a receiver to a transmitter, enabling the receiver to notify the transmitter about a time skew between a main polarization and a cross polarization. The transmitter optionally responds by delaying and/or advancing one or both of the main and cross polarization signals.

Figure 3:
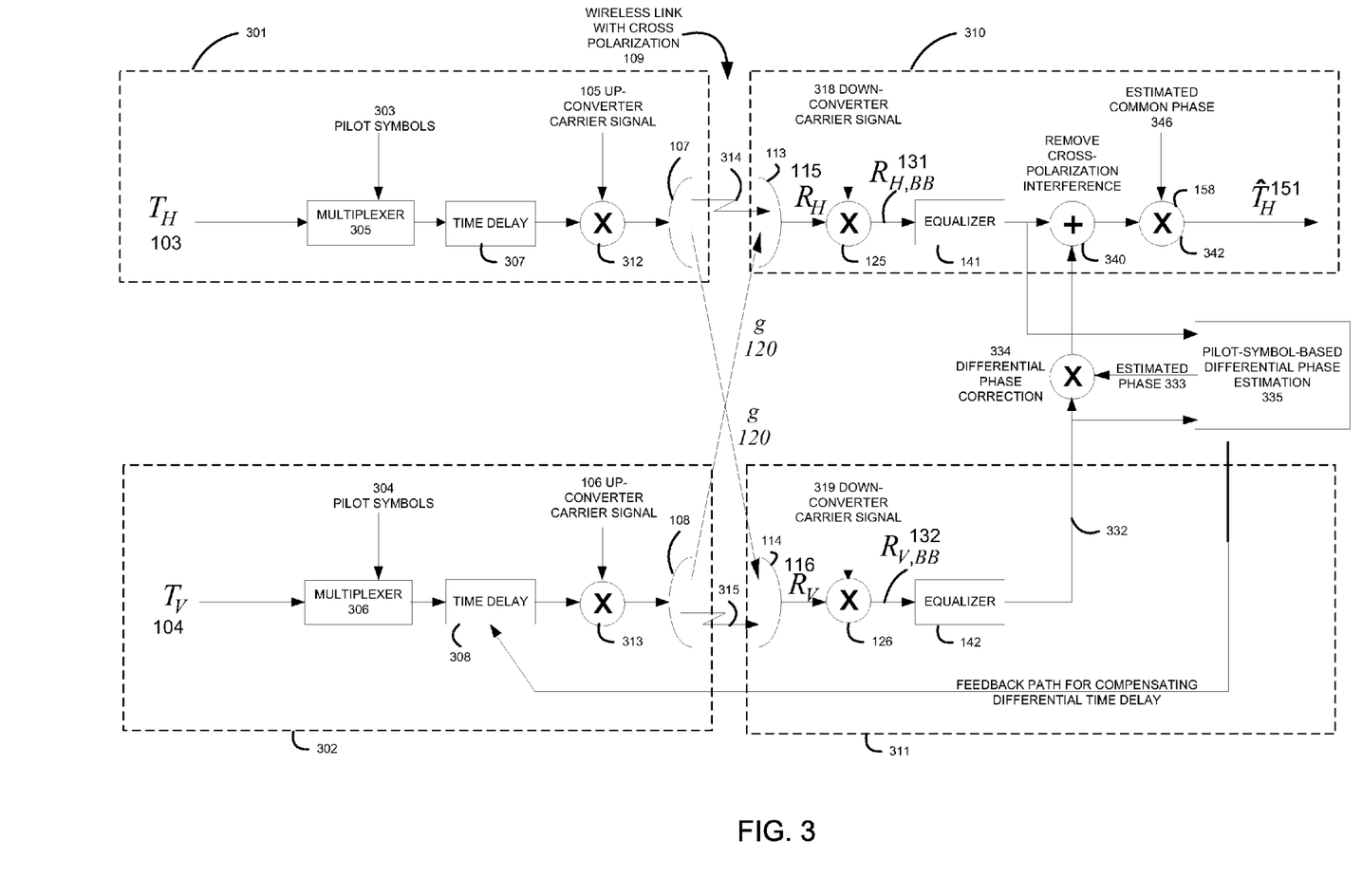
FIG. 3 is a simplified block diagram illustration of a dual polarization communication system constructed and operational according to an exemplary embodiment of the invention.

Reference is now made to FIG. 3, which is a simplified block diagram illustration of a dual polarization communication system 300 constructed and operational according to an exemplary embodiment of the invention.

The dual polarization communication system 300 includes a main polarization transmitter 301 and a cross polarization transmitter 302, a main polarization receiver 310 and a cross polarization receiver 311.

The two transmitters 301 302 transmit two data streams $T_H$ 103 and $T_V$ 104, using two carrier signals 105 106, in two orthogonal polarizations.

It is noted that the description of the transmitters 101 102 and receivers 110 111 of FIG. 1 applies to the transmitters 301 302 of FIG. 3 and to receivers 310 311 of FIG. 3. Explanation of the dual polarization communication system 300 includes the above explanation of the dual polarization communication system 100 made with reference to FIG. 1, and expands below upon the additional components and functionality.

In addition to the description of the transmitters 101 102, the transmitters 301 302 of FIG. 3 also include pilot symbols 303 304, multiplexers 305 306, and time delay buffers 307 308.

The two data streams $T_H$ 103 and $T_V$ 104 have pilot symbols 303 304 inserted by the multiplexers 305 306. As a result of the insertion, data streams with inserted pilot symbols are provided, through the time delay buffers 307 308, to mixers 312 313. The mixers 312 313 mix the data streams with up-converter carrier signals 105 106, thereby producing carrier signals 314 315 which carry the data streams.

It is noted that the present invention applies equally well when carrier signal frequencies are identical or somewhat different, yet close enough to cause interference. By way of example, when the difference in frequency between the carrier signals is less than the bandwidth of the signal. In order to simplify description, an identical carrier frequency is described for both carrier signals 105 106.

The transmitters 301 302 transmit the signals 314 315 to the receivers 310 311 via antennas 107 108. Due to imperfect isolation between polarizations, for example in transmitting antennas 107 108, receiving antennas 113 114, and in propagation channel 109, the two carrier signals for transmission 314 315 often mix.

Received signals, $R_H$ 115 and $R_V$ 116, are often mixtures of the transmission signals with g 120, a mixing coefficient. In practical systems g 120 is different for the two received signals 115 116, and is also time varying, frequency dependent, and complex. These complicating factors referring to g 120 do not influence the present invention, and are therefore not discussed.

The received signals $R_H$ 115 and $R_V$ 116 are down-converted to base-band signals $R_{H,BB}$ 131 and $R_{V,BB}$ 132 using two converters 125 126, and optionally equalized by equalizers 141 142.

The two down-converters 125 126 may use separate RF sources, which may have different phase noise and possibly somewhat different down-converter carrier signal frequencies. The invention applies equally well when frequencies are identical or different, so for purpose of simplicity of description the two frequencies are identical. Also for simplicity of description the two frequencies are taken as identical to an up-converter frequency at the transmitters and the two down-conversion frequencies are also taken as identical to the carrier signal 105 106 frequencies.

Estimation of the H-polarization signal is now described, and it is noted that estimation of the V-polarization signal is done in a similar manner.

Equation 3 implies that in order to estimate the transmitted symbols, two phase rotations are done. In order to estimate a transmitted symbol $\hat{T}_H$ 151 of the H-polarization signal, a cross polarization signal 332 has to be rotated by an estimated phase difference 333.

FIG. 3 depicts a mixer 334 used for rotation. The phase difference is estimated by a pilot-symbol-based differential phase estimator 335, which accepts input from the equalizers 141 142 of the receivers 310 311 respectively, and provides the estimated phase difference 333 to the mixer 334.

The differential phase estimator 335 and the mixer 334 may be included in the main polarization receiver 310, in the cross polarization receiver 311, or as a separate component.

Where the rotation is performed is not consequential for purpose of the present invention.

The cross polarization signal 332 is rotated by the mixer 334, after which the result of the rotation is subtracted from the main polarization signal by a subtraction unit 340. A result of the subtraction is further rotated by a mixer 342 by an estimate of the common phase 346.

A similar estimation is performed for the V-polarization signal.

The gain values applied to the main and cross signals, $$\frac{1}{1-g^2}$$

and $$\frac{g}{1-g^2}$$

respectively, are obtained using equalizers 141 142.

As stated above, the gain values are typically frequency dependent, time varying and complex, and the equalizer optionally implements time-varying filters. Scalar gain values g 120 are used in FIG. 3 for simplification only.

Rotation 334 of the cross-polarization signal by the differential phase enables canceling the cross-polarization component from the main-polarization signal by subtraction. The remaining signal contains main polarization components only. Thus, if pilot symbols are inserted into the cross polarization signal, the pilot symbols exist only before the subtraction.

In some embodiments of the invention the differential phase estimator 335 sends a signal to time delay buffers 307 308 in one or both of the transmitters 310 302. The time delay buffers 307 308 optionally serve for delaying a signal of one transmitter relative to the other in order that a difference in time between the main and cross polarization be minimal.

In some embodiments of the invention a sequence of consecutive silent pilot symbols is optionally transmitted periodically, instead of a single pilot symbol transmitted periodically. Such a sequence provides a benefit of reduced sensitivity to the differential delay between the main and cross signals. The sequence incurs a cost of increased bandwidth consumption.

In some embodiments of the invention, while sending silent pilot symbols in the main polarization, the cross polarization signal optionally transmits regular data instead of a regular pilot symbol. The power of the symbol with which the differential phase is estimated is not constant, since the magnitude of data symbols is generally not constant. While adding a slight complication to the filtering process, and possibly degrading an estimation quality, the embodiment saves bandwidth.

In some embodiments of the invention, a period of the regular pilot symbols and the silent pilot symbols is optionally arbitrary.

In some embodiments of the invention regular pilot symbols are inserted instead of silent pilot symbols. The regular pilot symbols are removed from the received data signal in order to unveil a buried cross-polarization component. In order to unveil the buried cross-polarization component the phase of the pilots in the main polarization should be known. The phase of the pilot symbols in the main polarization is optionally estimated by extrapolating the estimated common phase. Once the phase of a pilot symbol is estimated, the phase is optionally subtracted from the phase of the main polarization signal. The effect is as if a silent pilot was used. The embodiment provides spectral efficiency, since there is no waste bandwidth for silent pilot symbols. The embodiment requires additional complexity.

Figure 4:
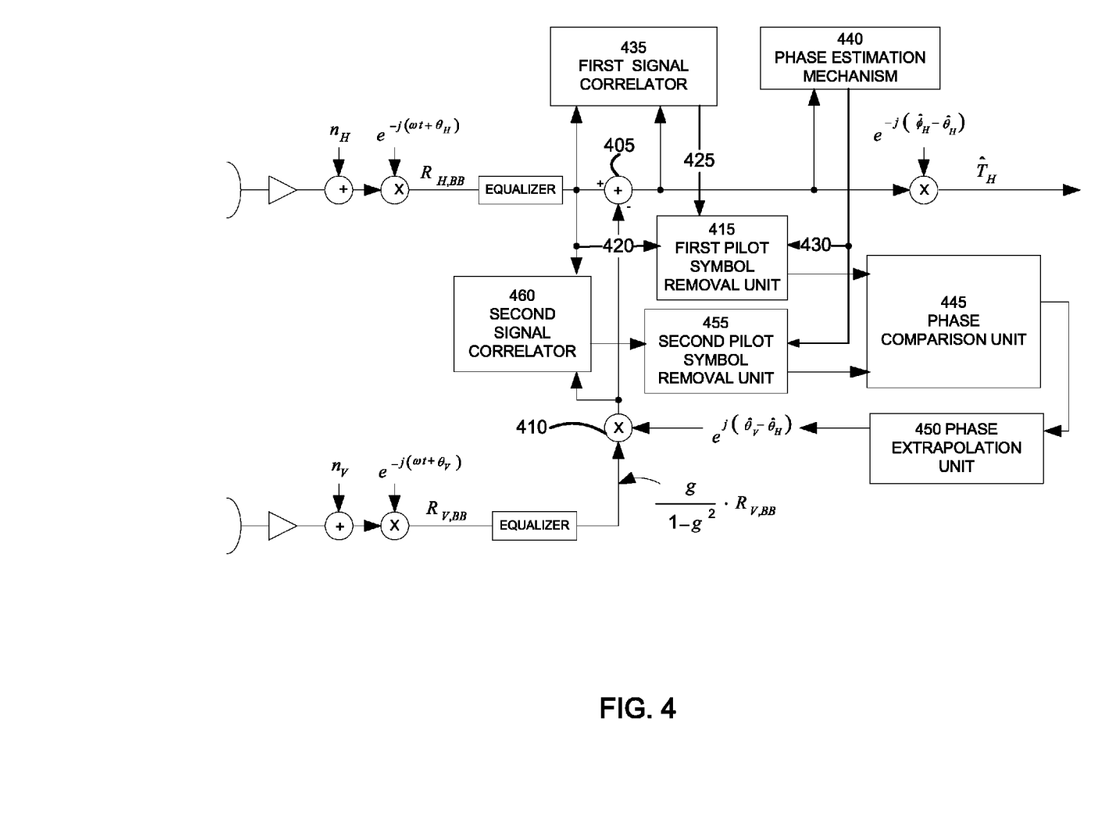
FIG. 4 is a simplified block diagram illustration of cross polarization interference elimination in an exemplary embodiment without using silent pilot symbols in a main polarization signal.

Reference is now made to FIG. 4, which is a simplified block diagram illustration of cross polarization interference elimination in an exemplary embodiment without using silent pilot symbols in a main polarization signal.

FIG. 4 is depicted with blocks and signal flow drawn similarly to the blocks and signal flow of FIG. 1, for purpose of better understanding of the exemplary embodiment described in FIG. 4.

For purpose of simplification of explanation, it is assumed that the cross polarization interference elimination is in a steady state. In the steady-state, the cross polarization interference is cancelled out, and a satisfactory signal quality is obtained. Prior to the steady state, the exemplary embodiment of FIG. 4 goes through a convergence phase which ends at the steady state. Generally, the exemplary embodiment progresses in a random-like fashion from state to state until the exemplary embodiment locks into the steady state, and stays in the steady state.

In alternative embodiments of the invention, convergence is optionally data aided, based on training sequences.

In still other alternative embodiments of the invention, an organized search for the steady state is optionally implemented, by way of a non-limiting example by going through a set of possible values for phase rotation coefficients.

To simplify the explanation, without violating the generality of the approach, we describe removing V-polarization interference from an H-polarization signal. A corresponding method is applied to remove H-polarization interference from a V-polarization signal.

In the steady state an adder 405 subtracts V-polarization interference from the H-polarization signal. In order for the subtraction to yield a desired result, the subtracted signal has to be in the correct phase. A phase rotator 410 performs the phase correction. Other components enable the phase rotator 410 to track a differential phase between an interfering component in the H-polarization signal and in the V-polarization signal.

In previous embodiments the H-polarization signal occasionally mutes its output, that is, transmits a "zero" symbol. When the "zero" symbol is not transmitted, the present embodiment subtracts a regular pilot symbol which is embedded in the H-signal and thus obtains an H signal as if a zero pilot symbol has been transmitted instead of the regular pilot symbol. Removing the regular pilot symbol is done in a first pilot symbol removal unit 415.

The first pilot symbol removal unit 415 accepts three input signals: signal 420, signal 425, and signal 430. The signal 420 corresponds to the H signal before removing the interference. The signal 425 indicates a magnitude of a received pilot symbol in H-polarization. The signal 430 indicates a phase of the received pilot symbol in H-polarization. Using the signal 425 and the signal 430 the H-polarization pilot symbol is subtracted from the signal 420.

Following is an explanation of why the magnitude of the H-polarization pilot symbol is evaluated in the signal 420. When an H-polarization pilot symbol is transmitted, the H-polarization pilot symbol is received in both the H and the V polarization signals. The signal 420 contains only the component received in the H-polarization. The present embodiment is designed such that after subtraction in the adder 405 a correct magnitude is obtained. Before subtraction, the magnitude was unknown. By comparing the magnitude of the signal before and after subtraction a gain is identified. The additive noise and interference are averaged in order to obtain good results. The averaging is optionally performed using a first signal correlator 435. The H and V signals received while an H polarization pilot symbol ($P_H$) is received are given by:

$$H_{Signal} = \alpha \cdot P_H \cdot e^{j\theta_1} + \text{noise} + V_{component}$$

$$V_{Signal} = \beta \cdot P_H \cdot e^{j\theta_2} + \text{noise} + V_{component}$$

$$\alpha - \beta = 1 \qquad \text{Equation 8}$$

Equation 8 above is provided with an assumption that the differential phase between the received signals has been compensated. After subtraction the following is true:

$$H_{output} = H_{Signal} - V_{Signal} = P_H \cdot e^{j\theta} + \text{noise} \qquad \text{Equation 9}$$

where $\theta$ denotes phase rotation of a pilot symbol after subtraction in the adder 405.

Correlating an output signal described in Equation 9 with an input signal described by Equation 8 provides:

$$E\{H_{Signal} \cdot H^*_{Output}\} = \alpha \cdot |P_H|^2 \cdot e^{j(\theta_1 - \theta)} \qquad \text{Equation 10}$$

Since $P_H$ is known, the magnitude —$\alpha$ is optionally evaluated. In order to completely remove the pilot symbol from the H signal, the phase has to be known as well. The correlation output of Equation 10 provides a phase denoted by $(\theta_1 - \theta)$, while a phase estimation mechanism 440 estimates $\theta$. A difference of the above phases is the phase of the pilot symbol in the signal 420. The first pilot symbol removal unit 415 therefore has the information needed, magnitude and phase, to remove the pilot symbol from the H signal.

The first pilot symbol removal unit 415 outputs the received H-polarization signal after removing the pilot symbol to a phase comparison unit 445. Since the pilot has been removed, remaining components in the output signal of the first pilot symbol removal unit 415 are the V polarization signal which was coupled to the H polarization signal, and noise. The phase comparison unit 445 optionally compares the phase of the V component in the received V signal and the V component in the received H signal. The comparison enables determining, by a phase extrapolation unit 450, a phase by which the V signal should be rotated.

In case the V signal contains substantially mainly the V transmitted component, then phase comparison in the phase comparison unit 445 is performed directly on the V signal. In case a substantially significant portion of the V signal contains an H-polarization component, than a remaining H component $-\beta \cdot P_H \cdot e^{j\theta_2}$, is optionally removed from the V signal before phase comparison. The removal is performed in a second, optional, pilot symbol removal unit 455. The H component is a transmitted pilot symbol, but the phase and magnitude of the transmitted pilot symbol are not known. An optional second signal correlator 460 optionally estimates the magnitude of the transmitted pilot symbol. Signals entering the second signal correlator 460 are defined by Equation 8 above. The output signal of the second signal correlator 460 is calculated as in Equation 9. Correlating $H_{output}$ with the V-signal yields:

$$E\{V_{Signal} \cdot H^*_{Output}\} = \beta \cdot |P_H|^2 \cdot e^{j(\theta_2 - \theta)} \qquad \text{Equation 11}$$

An interference magnitude β is optionally estimated using Equation 11, and an interference phase is optionally estimated by subtracting the phase in the signal 430 from a phase obtained by Equation 11.

The phase comparison unit 445 provides a phase difference between the V components in the V and H signals to the phase extrapolation unit 450. The phase difference is provided periodically, during appearance of pilot symbols in the H signal. The phase extrapolation unit 450 predicts the phase difference in future time instances, by way of a non-limiting example by mathematical extrapolation, and/or by statistical prediction tools known in the signal processing community. The V signal is optionally rotated by the predicted phase values by the phase rotator 410.

Figure 5:
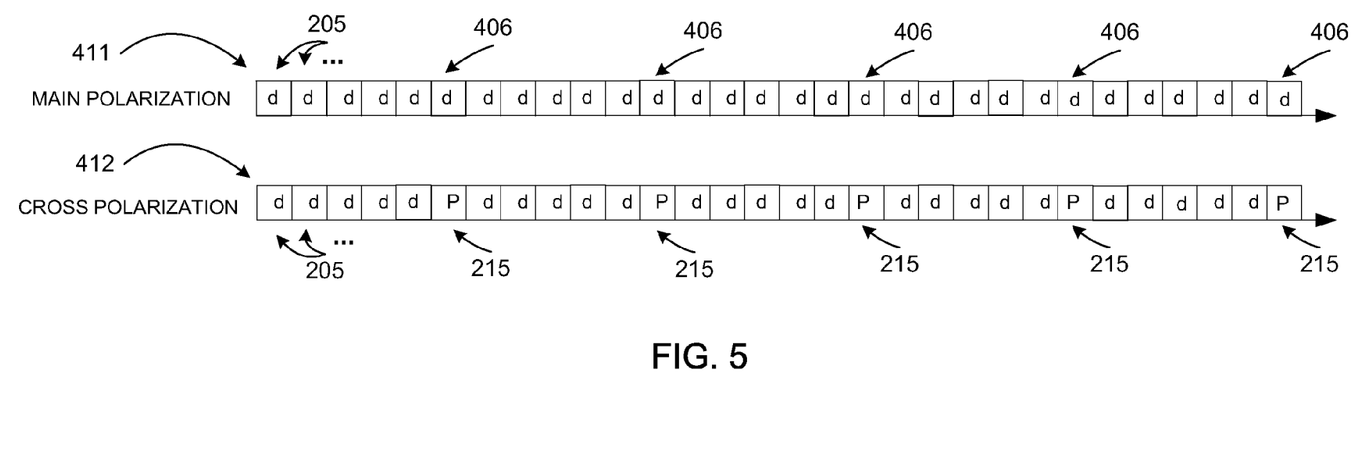
FIG. 5 is a simplified illustration of a timeline of a main data stream and a cross data stream, in which the main data stream and the cross data stream are produced according to yet another alternative embodiment of the invention

Reference is now made to FIG. 5, which is a simplified illustration of a timeline of a main data stream and a cross data stream, in which the main data stream and the cross data stream are produced according to yet another alternative embodiment of the invention.

A main data stream 411 and a cross data stream 412 have data symbols 205. Occasionally the cross data stream 412 has regular pilot symbols 215 inserted. Simultaneously with receiving the regular pilot symbols 215, data symbols 406 are received.

Since the regular pilot symbols 215 of the cross data stream 412 are known both in phase and in magnitude, it is possible to estimate differential phase whenever substantially simultaneous data symbols 205 in the main data stream 411 are also known. In some cases, the data symbols 205 are known, and sometimes even known in advance. For example, if the data symbols 205 are part of a frame header or a packet header, they may be known in advance. When the data symbols 205 are known, and the regular pilot symbols 215 are known, the difference between the actual received horizontal signal and the expected horizontal signal is optionally calculated. The difference is caused by interference and by noise. The differential phase noise is estimated similarly to the method described above with reference to FIG. 4.

Non-limiting examples of cases when the data symbols 205 are known include when the data symbols 205 belong in a packet header and have a value which is known, and/or expected.

It is noted that data values which are expected may optionally function substantially similarly to pilot symbols in example embodiments of the invention.

It is expected that during the life of a patent maturing from this application many relevant communication systems will be developed and the scope of the terms pilot symbol and silent pilot symbol is intended to include all such new technologies a priori.

The terms "comprising", "including", "having" and their conjugates mean "including but not limited to".

As used herein, the singular form "a", "an" and "the" include plural references unless the context clearly dictates otherwise. For example, the term "a unit" or "at least one unit" may include a plurality of units, including combinations thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for estimating interference between a plurality of carrier signals in a multi-channel system comprising:
    injecting a silent pilot symbol into a first carrier signal and transmitting the first carrier signal;
    injecting a non-silent pilot symbol into a second carrier signal at the same time the silent pilot symbol is injected into the first carrier signal and transmitting the second carrier signal;
    receiving at least the first carrier signal and the second carrier signal; and
    estimating differential phase interference between the received first carrier signal and the received second carrier signal based, at least in part, on measuring the received first carrier signal when the silent pilot symbol of the first carrier signal is received.

2. The method of claim 1 in which the first carrier signal and the second carrier signal are orthogonally polarized relative to each other.

3. The method of claim 1 in which the estimating is performed by:
    equalizing the received first carrier signal and the received second carrier signal; and
    measuring the differential phase between the equalized received first carrier signal and the equalized received second carrier signal,
    when a pilot symbol of the first carrier signal is received.

4. The method of claim 1 in which the injecting pilot symbols into a first carrier signal comprises injecting a plurality of consecutive pilot symbols into the first carrier signal.

5. The method of claim 1 in which the plurality of carrier signals comprises more than two carrier signals.

6. The method of claim 5 in which the plurality of carrier signals are injected with pilot symbols and the plurality of carrier signals are transmitted.

7. The method of claim 6 in which the injecting pilot symbols into a first one of the plurality of carrier signals is done substantially at the same time non-silent pilot symbols are injected into others of the plurality of carrier signals.

8. The method of claim 6 in which the injecting non-silent pilot symbols into a first one of the plurality of carrier signals is done substantially at the same time as silent pilot symbols are injected into others of the plurality of carrier signals.

9. A point-to-point communication system comprising:
    a plurality of receivers for a plurality of carrier signals; and
    an interference estimator configured to estimate differential phase between at least two of the plurality of carrier signals based, at least in part, on receiving a silent pilot symbol in at least one of the at least two of the plurality of carrier signals and a non-silent pilot symbol at the same time in at least another of the at least two of the plurality of carrier signals.

10. A multi-channel communication system comprising:
    a plurality of transmitters for a plurality of carrier signals;
    a pilot symbol injector for injecting pilot symbols into at least one of the carrier signals,
    a plurality of receivers for the plurality of carrier signals; and
    an interference estimator configured to estimate differential phase interference between at least two of the plurality of carrier signals based, at least in part, on receiving a silent pilot symbols injected by, the pilot symbol injector in at least one of the at least two of the plurality of carrier signals, and a non-silent pilot symbol injected by the pilot symbol injector at the same time in at least one other of the at least two of the plurality of carrier signals.

11. Apparatus using the method of claim 1.

12. A computer program embodied on a non-transitory computer-readable medium for implementing the method of claim 1.

13. Apparatus for estimating interference between a plurality of carrier signals in a multi-carrier communication system comprising:
    means for injecting silent pilot symbols into a first carrier signal;
    means for injecting non-silent pilot symbols into a first carrier signal at the same time as silent pilot, symbols are injected into the first carrier signal;
    means for transmitting the first carrier signal;
    means for transmitting a second carrier signal;
    means for receiving at least the first carrier signal and the second carrier signal;
    means for estimating differential phase interference between the first carrier signal and the second carrier signal based, at least in part, on measuring the received signal of the first carrier signal during reception of the silent pilot symbols of the first carrier.

* * * * *